US012748926B2

(12) United States Patent
Sahoo et al.

(10) Patent No.: US 12,748,926 B2
(45) Date of Patent: Sep. 29, 2026

(54) MACHINE LEARNING BASED SYSTEMS AND METHODS FOR ANALYZING INTENT OF EMAILS

(71) Applicant: HIGHRADIUS CORPORATION, Houston, TX (US)

(72) Inventors: Dibya Prakash Sahoo, Hyderabad (IN); Sumit Gupta, Hyderabad (IN); Liza Mohanty, Hyderabad (IN); Barkha Sinha, Hyderabad (IN); Pratyush Sunandan, Hyderabad (IN); Lipsa Mishra, Hyderabad (IN); Sonali Nanda, Hyderabad (IN); Manish Kumar Choudhary, Hyderabad (IN); Abhinav Pachauri, Hyderabad (IN)

(73) Assignee: HIGHRADIUS CORPORATION

( * ) Notice: Subject to any disclaimer, the term of this patent is extended or adjusted under 35 U.S.C. 154(b) by 192 days.

(21) Appl. No.: 18/398,189

(22) Filed: Dec. 28, 2023

(65) Prior Publication Data

US 2025/0217597 A1 Jul. 3, 2025

(51) Int. Cl.
*G06F 40/35* (2020.01)
*G06F 40/284* (2020.01)
*G06N 20/00* (2019.01)

(52) U.S. Cl.
CPC ............ *G06F 40/35* (2020.01); *G06F 40/284* (2020.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,856,249 | B2 * | 10/2014 | Liberty et al. | G06Q 10/107 |
| 11,200,267 | B2 * | 12/2021 | Kadatoka et al. | G06F 16/353 |
| 11,481,734 | B2 * | 10/2022 | Venkatasubramanian et al. | G06N 20/20 |
| 11,914,630 | B2 * | 2/2024 | Wu et al. | G06N 20/00 |
| 2022/0207483 | A1 * | 6/2022 | Agarwal et al. | G06F 40/284 |
| 2024/0062011 | A1 * | 2/2024 | Kanuga et al. | G06F 40/35 |

(Continued)

OTHER PUBLICATIONS

Sun, "Stably Extracting Text Contents from Email Messages with Python", Aug. 4, 2009.*

*Primary Examiner* — Paras D Shah
*Assistant Examiner* — Nicholas D Lowen
(74) *Attorney, Agent, or Firm* — Jason C. Cameron

(57) ABSTRACT

A machine learning based computing method for analyzing intent of electronic mails, is disclosed. The machine learning based computing method includes steps of: receiving metadata associated with the electronic mails from databases; extracting first textual contents from last received electronic mails stored in electronic mail files by preprocessing the last received electronic mails; analyzing the intent of the electronic mails based on a first machine learning model; classifying the electronic mails into reason codes based on a second machine learning model; extracting information associated with named entities from unstructured and unlabeled electronic mails based on a third machine learning model; grouping the electronic mails into categories based on the intent of the electronic mails, the reason codes, and standardized information associated with the named entities; and providing an output of categorized electronic mails to users on a user interface associated with electronic devices.

18 Claims, 7 Drawing Sheets

(56) References Cited

U.S. PATENT DOCUMENTS

| | | | | |
|---|---|---|---|---|
| 2024/0062016 | A1* | 2/2024 | Tong et al. ............. | G06F 40/20 |
| 2024/0203404 | A1* | 6/2024 | Shabat et al. ........... | G10L 15/16 |

* cited by examiner

(Contd.,)

MACHINE LEARNING BASED SYSTEMS AND METHODS FOR ANALYZING INTENT OF EMAILS

FIELD OF INVENTION

Embodiments of the present disclosure relate to machine learning based (ML-based) computing systems, and more particularly relates to a ML-based computing method and system for analyzing an intent of one or more electronic mails and segmenting the one or more electronic mails according to the intent.

BACKGROUND

In a field of managing accounts receivables, personnel such as financial analysts hold a crucial position in addressing customer inquiries and managing diverse responsibilities, including fulfilling requests for invoice copies, generating account statements, handling escalations related to disputes, and the like.

The current workflow utilized for understanding the nature or intent of an electronic mail (Email), is characterized by its manual and subjective process. The manual process involves a series of steps to identify intentions of incoming customer electronic mails and then to proceed with necessary actions. In the current workflow, the analysts manually review and interpret the electronic mails to discern the customer's specific intentions and determine the appropriate actions required for individual accounts.

However, the traditional manual process comes with notable drawbacks. Firstly, the traditional manual process is a time-consuming procedure, requiring substantial effort from the analysts who need to meticulously assess and understand each electronic mail individually. Secondly, the manual aspect of the process introduces a significant risk of human error, as the accuracy of task creation heavily relies on the analyst's abilities to comprehend the electronic mail's nature and to address customer requests.

Moreover, inconsistencies may emerge due to variations in how different analysts interpret and respond to similar requests, potentially resulting in operational inefficiencies and customer dissatisfaction. Additionally, with the escalating volume of customer communications, the current manual process becomes increasingly impractical and challenging to scale efficiently.

Hence, there is a need for an improved machine learning based (ML-based) computing system and method for analyzing an intent of one or more electronic mails, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) computing method for analyzing an intent of one or more electronic mails, is disclosed. The ML-based computing method comprises receiving, by one or more hardware processors, one or more metadata associated with the one or more electronic mails from one or more databases. The one or more metadata associated with the one or more electronic mails comprise at least one of: one or more primary electronic mail keys, one or more raw electronic mail links, one or more conversation identities, one or more electronic mail receipt dates, and one or more sender identities.

The ML-based computing method further comprises extracting, by the one or more hardware processors, one or more first textual contents from one or more last received electronic mails within one or more electronic mail chains stored in one or more electronic mail files by preprocessing the one or more last received electronic mails.

The ML-based computing method further comprises analyzing, by the one or more hardware processors, the intent of the one or more electronic mails based on a first machine learning model.

The ML-based computing method further comprises classifying, by the one or more hardware processors, the one or more electronic mails into one or more reason codes based on a second machine learning model.

The ML-based computing method further comprises extracting, by the one or more hardware processors, information associated with one or more named entities from textual information associated with one or more unstructured and unlabeled electronic mails based on a third machine learning model.

The ML-based computing method further comprises standardizing, by the one or more hardware processors, the extracted information associated with the one or more named entities by refining and harmonizing the information associated with the one or more named entities.

The ML-based computing method further comprises grouping, by the one or more hardware processors, the one or more electronic mails into one or more categories based on at least one of: the intent of the one or more electronic mails, the one or more reason codes, and the standardized information associated with the one or more named entities.

The ML-based computing method further comprises providing, by the one or more hardware processors, an output of one or more categorized electronic mails to one or more users on a user interface associated with one or more electronic devices.

In an embodiment, preprocessing the one or more last received electronic mails comprises: identifying, by the one or more hardware processors, the one or more last received electronic mails by analyzing one or more timestamps associated with the one or more electronic mails based on an electronic mail identification process: detecting, by the one or more hardware processors, the one or more first textual contents within the one or more electronic mail files by applying a regular expression text extraction process; converting, by the one or more hardware processors, the one or more hypertext markup language (HTML) embedded contents to the one or more plain textual contents by parsing the one or more hypertext markup language (HTML) embedded contents based on an hypertext markup language (HTML) parsing process; and extracting, by the one or more hardware processors, one or more sender information from the one or more electronic mail files to identify and remove one or more second textual contents associated with the one or more electronic mail senders.

The regular expression text extraction process is configured to be applied on one or more electronic mail formatting settings for detecting at least one of: one or more plain textual contents and one or more hypertext markup language (HTML) embedded contents. The one or more second textual contents associated with the one or more electronic mail senders comprise at least one of, greetings, salutations, and signatures.

In another embodiment, analyzing, by the first machine learning model, the intent of the one or more electronic mails comprises: obtaining, by the one or more hardware processors, at least one of: the one or more metadata and the one or more first textual contents extracted from the one or more last received electronic mails; analyzing, by the one or more hardware processors, at least one of: the one or more metadata and the one or more first textual contents to optimize one or more text data associated with at least one of: the one or more metadata and the one or more first textual contents, based on a tokenization process; converting, by the one or more hardware processors, the one or more text data associated with at least one of: the one or more metadata and the one or more first textual contents, into one or more tokens, based on the tokenization process; and analyzing, by the one or more hardware processors, the intent of the one or more electronic mails by categorizing the one or more electronic mails into one or more distinct intent categories based on a multilabel classification process.

The first machine learning model is configured to detect one or more semantic relationships on the one or more text data based on the one or more tokens. The one or more distinct intent categories comprise at least one of: procure-to-pay (P2P), dispute, follow up, account statement request, invoice request, payment confirmation, query and miscellaneous.

In yet another embodiment, the first machine learning model is fine-tuned for categorizing the one or more electronic mails into one or more distinct intent categories. The first machine learning model is optimized to categorize the one or more electronic mails into one or more distinct intent categories by selecting one or more hyperparameters comprising at least one of: learning rates, batch sizes, and regularization strength. The first machine learning model is trained to learn from the one or more electronic mails being labelled under the one or more distinct intent categories.

In yet another embodiment, analyzing, by the first machine learning model, the intent of the one or more electronic mails further comprises: generating, by the first machine learning model, one or more confidence scores for each intent analyzed for the one or more electronic mails by providing probability distribution over the one or more tokens based on a softmax function. The one or more tokens with optimum probability are selected as the analyzed intent of the one or more electronic mails.

In yet another embodiment, classifying, by the second machine learning model, the one or more electronic mails into the one or more reason codes comprises: obtaining, by the one or more hardware processors, the one or more first textual contents: converting, by the one or more hardware processors, the one or more first textual contents into the one or more tokens, based on the tokenization process; applying, by the one or more hardware processors, entity masking process on the one or more first textual contents to normalize one or more words essential in the one or more first textual contents; applying, by the one or more hardware processors, at least one of: a lemmatization process and a stopword process to refine the one or more first textual contents; extracting, by the one or more hardware processors, one or more first linguistic information associated with the one or more tokens corresponding to the one or more first textual contents; generating, by the one or more hardware processors, one or more contextually relevant embeddings capturing intricate semantics related to the one or more electronic mails by applying the extracted one or more first linguistic information on the first machine learning model; assigning, by the one or more hardware processors, one or more scores to the one or more reason codes based on at least one of: the one or more contextually relevant embeddings and the one or more first linguistic information associated with the one or more electronic mails; and classifying, by the one or more hardware processors, the one or more reason codes for the one or more electronic mails based on one or more optimum scores assigned to the one or more reason codes.

The one or more reason codes comprise at least one of: one or more product reason codes, one or more service reason codes, one or more customer reason codes, one or more account reason codes, one or more transaction reason codes, one or more location reason codes, one or more payment reason codes.

In yet another embodiment, the third machine learning model is an integration of at least one of: the first machine learning model and the second machine learning model. Extracting, by the third machine learning model, the information associated with the one or more named entities comprises: obtaining, by the one or more hardware processors, the textual information associated with the one or more unstructured and unlabeled electronic mails; scanning, by the one or more hardware processors, the textual information associated with the one or more unstructured and unlabeled electronic mails for extracting the one or more named entities; applying, by the one or more hardware processors, the textual information associated with the one or more unstructured and unlabeled electronic mails on the third machine learning model; and extracting, by the one or more hardware processors, one or more patterns indicating the one or more named entities by leveraging one or more second linguistic information associated with the one or more unstructured and unlabeled electronic mails.

The information associated with the one or more named entities comprises at least one of: names of one or more electronic mail senders, one or more organizations, one or more dates, one or more times, one or more invoice numbers, and one or more amounts.

In yet another embodiment, the ML-based computing method further comprises re-training, by the one or more hardware processors, one or more machine learning models comprising at least one of: the first machine learning model, the second machine learning model, and the third machine learning model, over a plurality of time intervals based on one or more training data. Re-training the one or more machine learning models over the plurality of time intervals comprises: receiving, by the one or more hardware processors, the one or more training data associated with the one or more categorized electronic mails, from an output subsystem; adding, by the one or more hardware processors, the one or more training data with one or more original training datasets to generate one or more updated training datasets; re-training, by the one or more hardware processors, the one or more machine learning models, by adjusting at least one of: the one or more hyperparameters and one or more training configurations of at least one of, an electronic mail intent analyzing subsystem, an electronic mail reason code classification subsystem, and a named entity recognition subsystem; and executing, by the one or more hardware processors, the re-trained one or more machine learning models in at least one of: the electronic mail intent analyzing subsystem, the electronic mail reason code classification subsystem, and the named entity recognition subsystem, to output the one or more categorized electronic mails.

In yet another embodiment, the one or more metadata associated with the one or more electronic mails, are extracted from the one or more databases based on one or more techniques comprising at least one of: data normalization, data anonymization, data aggregation, data analysis, and data storage. The one or more databases comprises at least one of: one or more relational databases, one or more object-oriented databases, one or more data warehouses, and one or more cloud-based databases.

In one aspect, a machine learning based (ML-based) computing system for analyzing an intent of one or more electronic mails, is disclosed. The ML-based computing system includes one or more hardware processors and a memory coupled to the one or more hardware processors. The memory includes a plurality of subsystems in the form of programmable instructions executable by the one or more hardware processors.

The plurality of subsystems comprises an electronic mail data receiving subsystem configured to receive one or more metadata associated with the one or more electronic mails from one or more databases. The one or more metadata associated with the one or more electronic mails comprise at least one of: one or more primary electronic mail keys, one or more raw electronic mail links, one or more conversation identities, one or more electronic mail receipt dates, and one or more sender identities.

The plurality of subsystems further comprises an electronic mail text extraction subsystem configured to extract one or more first textual contents from one or more last received electronic mails within one or more electronic mail chains stored in one or more electronic mail files by pre-processing the one or more last received electronic mails.

The plurality of subsystems further comprises an electronic mail intent analyzing subsystem configured to analyze the intent of the one or more electronic mails based on a first machine learning model.

The plurality of subsystems further comprises an electronic mail reason code classification subsystem configured to classify the one or more electronic mails into one or more reason codes based on a second machine learning model.

The plurality of subsystems further comprises a named entity recognition subsystem configured to extract information associated with one or more named entities from textual information associated with one or more unstructured and unlabeled electronic mails based on a third machine learning model.

The plurality of subsystems further comprises a named entity standardization subsystem configured to standardize the extracted information associated with the one or more named entities by refining and harmonizing the information associated with the one or more named entities.

The plurality of subsystems further comprises a categorization subsystem configured to group the one or more electronic mails into one or more categories based on at least one of: the intent of the one or more electronic mails, the one or more reason codes, and the standardized information associated with the one or more named entities.

The plurality of subsystems further comprises an output subsystem configured to provide an output of one or more categorized electronic mails to one or more users on a user interface associated with one or more electronic devices.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
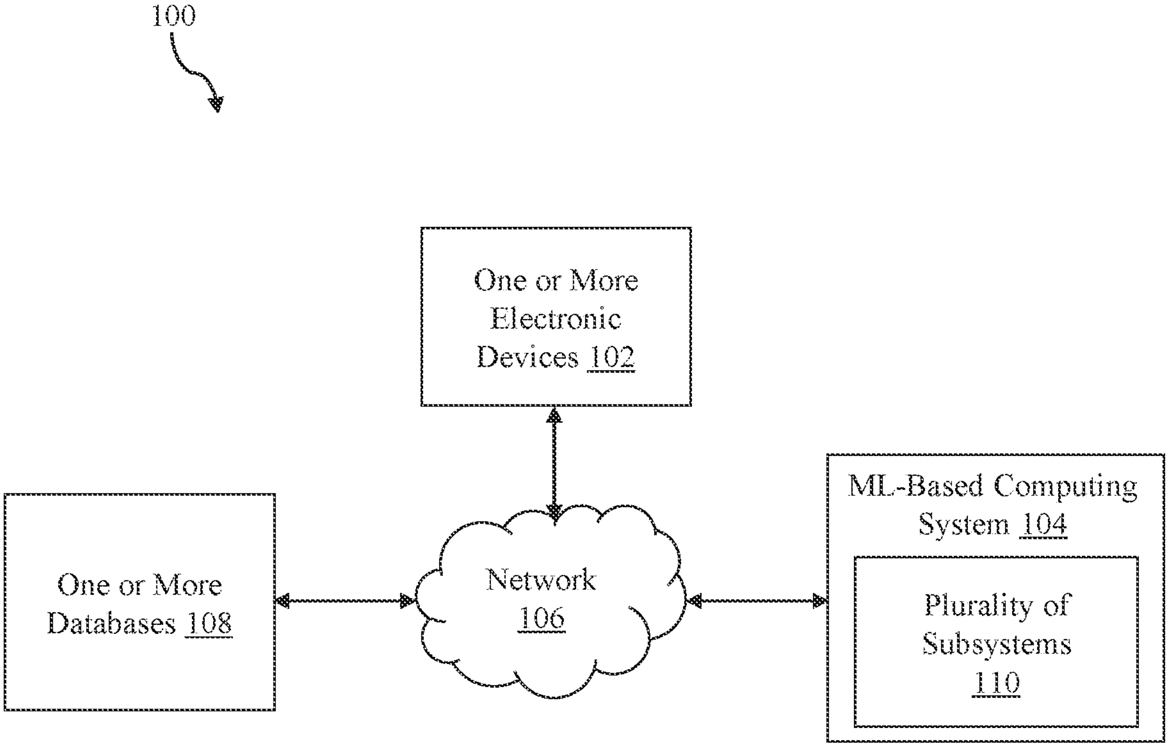
FIG. 1 is a block diagram illustrating a computing environment with a machine learning based (ML-based) computing system for analyzing an intent of one or more electronic mails and segmenting the one or more electronic mails based on the intent, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) computing system 104 for analyzing the intent of the one or more electronic mails (Emails) and segmenting the one or more electronic mails based on the intent, in accordance with an embodiment of the present disclosure. According to FIG. 1, the computing environment 100 includes one or more electronic devices 102 that are communicatively coupled to the ML-based computing system 104 through a network 106. The one or more electronic devices 102 through which one or more users provide one or more inputs to the ML-based computing system 104.

In an embodiment, the one or more users may include at least one of: one or more data analysts, one or more business analysts, one or more cash analysts, one or more financial analysts, one or more collection analysts, one or more debt collectors, one or more professionals associated with cash and collection management, and the like.

The present invention is configured to provide one or more categorized electronic mails to the one or more users. The ML-based computing system 104 is initially configured to receive one or more metadata associated with the one or more electronic mails from one or more databases 108. In an embodiment, the one or more metadata associated with the one or more electronic mails include at least one of: one or more primary electronic mail keys, one or more raw electronic mail links, one or more conversation identities, one or more electronic mail receipt dates, one or more sender identities, and the like.

The ML-based computing system 104 is further configured to extract one or more first textual contents from one or more last received electronic mails within one or more electronic mail chains stored in one or more electronic mail files by preprocessing the one or more last received electronic mails. In an embodiment, the one or more first textual contents are one or more relevant textual contents extracted from the one or more last received electronic mails. The ML-based computing system 104 is further configured to analyze the intent of the one or more electronic mails based on a first machine learning model. In an embodiment, the first machine learning model may be a first transformer-based machine learning model. The terms "the first machine learning model" and the "the first transformer-based machine learning model" may be used interchangeably in subsequent paragraphs.

The ML-based computing system 104 is further configured to classify the one or more electronic mails into one or more reason codes based on a second machine learning model. In an embodiment, the second machine learning model may be a second transformer-based machine learning model. The terms "the second machine learning model" and the "the second transformer-based machine learning model" may be used interchangeably in subsequent paragraphs. The ML-based computing system 104 is further configured to extract information associated with one or more named entities from textual information associated with one or more unstructured and unlabeled electronic mails based on a third machine learning model. In an embodiment, the third machine learning model may be a third transformer-based machine learning model. The terms "the third machine learning model" and the "the third transformer-based machine learning model" may be used interchangeably in subsequent paragraphs.

The ML-based computing system 104 is further configured to standardize the extracted information associated with the one or more named entities by refining and harmonizing the information associated with the one or more named entities. The ML-based computing system 104 is further configured to group the one or more electronic mails into one or more categories based on at least one of: the intent of the one or more electronic mails, the one or more reason codes, and the standardized information associated with the one or more named entities. The ML-based computing system 104 is further configured to provide an output of the one or more categorized electronic mails to the one or more users on a user interface associated with the one or more electronic devices 102.

The ML-based computing system 104 may be hosted on a central server including at least one of: a cloud server or a remote server. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more databases 108 communicatively coupled to the ML-based computing system 104 through the network 106.

In an embodiment, the one or more databases 108 includes at least one of: one or more relational databases, one or more object-oriented databases, one or more data warehouses, one or more cloud-based databases, and the like. In another embodiment, a format of the one or more data generated from the one or more databases 108 may include at least one of: a comma-separated values (CSV) format, a JavaScript Object Notation (JSON) format, an Extensible Markup Language (XML), spreadsheets, and the like. Furthermore, the one or more electronic devices 102 include at least one of: a local browser, a mobile application, and the like. Furthermore, the second one or more users may use a web application through the local browser, the mobile application includes the plurality of subsystems 110 in the form of programmable instructions executable by the one or more hardware processors 204.

The plurality of subsystems 110 includes an electronic mail data receiving subsystem 210, an electronic mail text extraction subsystem 212, an electronic mail intent analyzing subsystem 214, an electronic mail reason code classification subsystem 216, a named entity recognition subsystem 218, a named entity standardization subsystem 220, a categorization subsystem 222, an output subsystem 224, and a retraining subsystem 226. The brief details of the plurality of subsystems 110 have been elaborated in a below table.

| Plurality of Subsystems 110 | Functionality |
|---|---|
| Electronic mail data receiving subsystem 210 | The electronic mail data receiving subsystem 210 is configured to receive the one or more metadata associated with the one or more electronic mails from the one or more databases 108. |
| Electronic mail text extraction subsystem 212 | The electronic mail text extraction subsystem 212 is configured to extract the one or more first textual contents from the one or more last received electronic mails within the one or more electronic mail chains stored in the one or more electronic mail files by preprocessing the one or more last received electronic mails. |
| Electronic mail intent analyzing subsystem 214 | The electronic mail intent analyzing subsystem 214 is configured to analyze the intent of the one or more electronic mails based on the first machine learning model. |
| Electronic mail reason code classification subsystem 216 | The electronic mail reason code classification subsystem 216 is configured to classify the one or more electronic mails into the one or more reason codes based on the second machine learning model. |
| Named entity recognition subsystem 218 | The named entity recognition subsystem 218 is configured to extract the information associated with the one or more named entities from the textual information associated with the one or more unstructured and unlabeled electronic mails based on the third machine learning model. |
| Named entity standardization subsystem 220 | The named entity standardization subsystem 220 is configured to standardize the extracted information associated with the one or more named entities by refining and harmonizing the information associated with the one or more named entities. |
| Categorization subsystem 222 | The categorization subsystem 222 is configured to group the one or more electronic mails into the one or more categories based on at least one of: the intent of the one or more electronic mails, the one or more reason codes, and the standardized information associated with the one or more named entities. |
| Output Subsystem 224 | The output subsystem 224 is configured to provide the output of the one or more categorized electronic mails to the one or more users on the user interface associated with the one or more electronic devices 102. |
| Retraining Subsystem 226 | The retraining subsystem 226 is configured to re-train the one or more machine learning models over a plurality of time intervals with one or more training data. |

to communicate with the ML-based computing system 104. In an embodiment of the present disclosure, the ML-based computing system 104 includes a plurality of subsystems 110. Details on the plurality of subsystems 110 have been elaborated in subsequent paragraphs of the present description with reference to FIG. 2.

Figure 2:
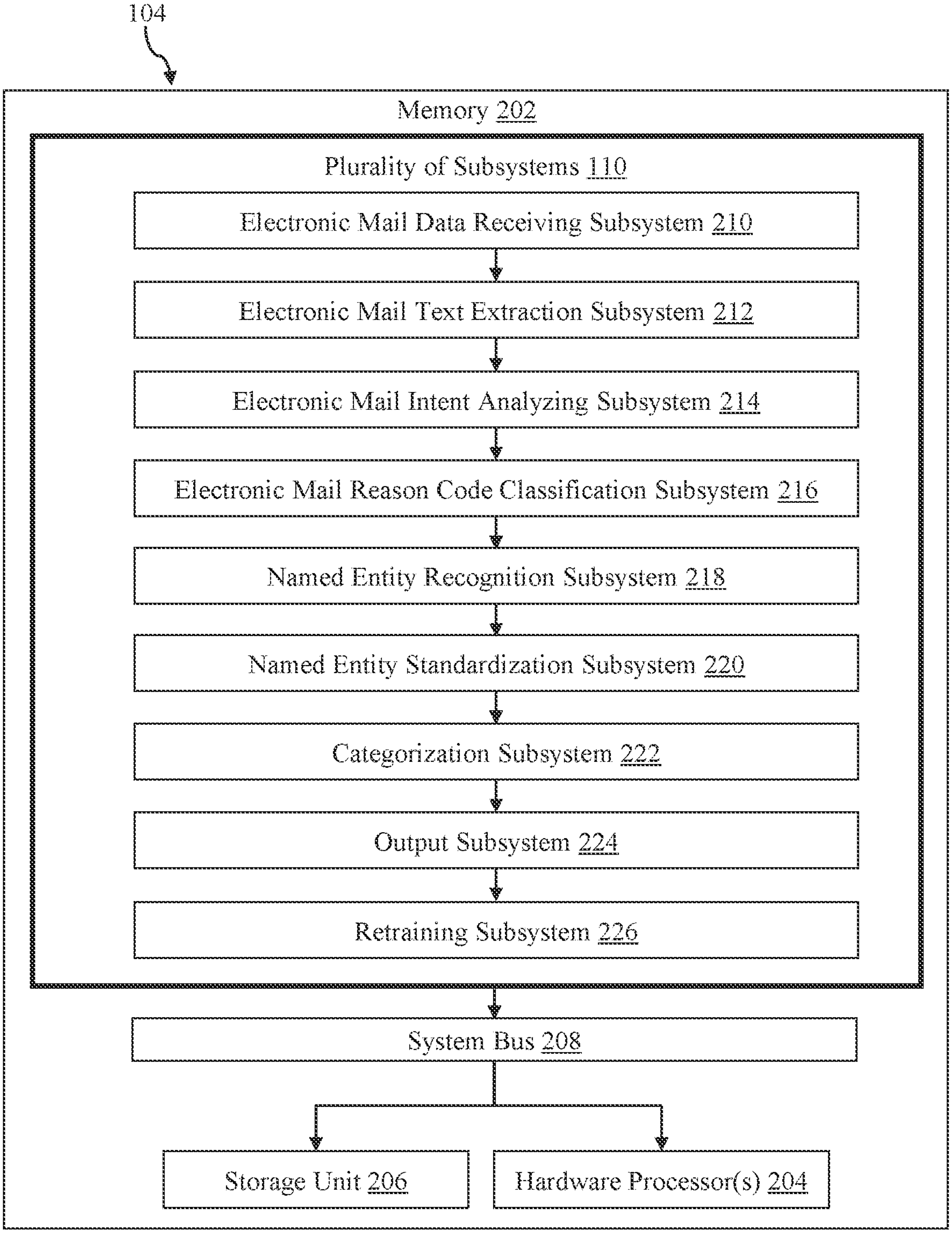
FIG. 2 is a detailed view of the ML-based computing system for analyzing the intent of the one or more electronic mails and segmenting the one or more electronic mails based on the intent, in accordance with another embodiment of the present disclosure.

FIG. 2 is a detailed view of the ML-based computing system 104 for analyzing the intent of the one or more electronic mails and segmenting the one or more electronic mails based on the intent, in accordance with another embodiment of the present disclosure. The ML-based computing system 104 includes a memory 202, one or more hardware processors 204, and a storage unit 206. The memory 202, the one or more hardware processors 204, and the storage unit 206 are communicatively coupled through a system bus 208 or any similar mechanism. The memory 202

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the electronic mail data receiving subsystem 210 that is communicatively connected to the one or more hardware processors 204. The electronic mail data receiving subsystem 210 is configured to receive the one or more metadata associated with the one or more electronic mails from the one or more databases 108.

In an embodiment, the one or more electronic mails are stored in a cloud storage in a format selected from a group including at least one of: an EML format (a plain text file format commonly used for storing single electronic mail messages), a MSG format (a Microsoft Outlook-specific binary format for individual electronic mail messages), a MBOX format (a format for storing multiple electronic mail messages as plain text files in a concatenated format), an EDB format (a database format used by Microsoft Exchange Server to store mailbox data), an EMLX format (a format employed by Apple Mail for individual electronic mail messages, each stored as a separate file) and the like.

In an embodiment, the one or more metadata associated with the one or more electronic mails include at least one of: one or more primary electronic mail keys, one or more raw electronic mail links, one or more conversation identities, one or more electronic mail receipt dates, one or more sender identities, and the like.

In an embodiment, the one or more primary electronic mail keys are configured to serve as a unique identifier for each electronic mail. The one or more primary electronic mail keys ensure an unambiguous referencing of individual electronic mails within the system, allowing for rapid and accurate retrieval during subsequent processing. In an embodiment, the one or more raw electronic mail links denote a cloud file path of the corresponding electronic mail (EML) file associated with each received electronic mail. The streamlined linkage to the electronic mail content facilitates seamless access and data integrity, ensuring that the actual content of the electronic mail is linked to its metadata.

In an embodiment, the one or more conversation identities are configured to uniquely identify one or more sequences of electronic mails that constitute back-and-forth conversations. By establishing connections between related electronic mails, the ML-based computing system 104 is configured to enable comprehensive organization and analysis of electronic mail threads, enhancing an overall user experience and facilitating efficient communication tracking. The one or more electronic mails that are part of the same conversation may have the same conversation identity.

In an embodiment, the one or more electronic mail receipt dates are configured to record a precise date on which each electronic mail is received. In an embodiment, the one or more sender identities are configured to capture/detect and retain an electronic mail address of a sender for each electronic mail.

In an embodiment, the one or more primary electronic mail keys, and the one or more conversation identities are uniquely assigned by the ML-based computing system 104. In another embodiment, the one or more primary electronic mail keys, and the one or more conversation identities follow auto-increment to generate a new value for each electronic mail. In an embodiment, when a new electronic mail is received by the ML-based computing system 104, the electronic mail data receiving subsystem 210 is configured to extract the one or more metadata from the one or more electronic mails and to update the one or more databases 108 including the one or more metadata allowing efficient storage and retrieval of important information about the received electronic mails.

The plurality of subsystems 110 further includes the electronic mail text extraction subsystem 212 that is communicatively connected to the one or more hardware processors 204. The electronic mail text extraction subsystem 212 is configured to extract the one or more first textual contents from the one or more last received electronic mails within the one or more electronic mail chains stored in the one or more electronic mail files by preprocessing the one or more last received electronic mails. In other words, the electronic mail text extraction subsystem 212 is configured to initiate the extraction process by accessing the designated EML file via the cloud file path. The EML file includes a sequence of electronic mails within one or more mail chains. In an embodiment, the one or more first textual contents are one or more relevant textual contents extracted from the one or more last received electronic mails. In another embodiment, the one or more first textual contents may include a main body text of the one or more electronic mails excluding one or more second textual contents.

In an embodiment, the one or more metadata associated with the one or more electronic mails, are extracted from the one or more databases 108 based on one or more techniques including at least one of: data normalization, data anonymization, data aggregation, data analysis, data storage, and the like.

In an embodiment, for preprocessing the one or more last received electronic mails, the electronic mail text extraction subsystem 212 is configured to identify the one or more last received electronic mails by analyzing one or more timestamps associated with the one or more electronic mails based on an electronic mail identification process. The identification of the one or more last received electronic mails ensures that the most recent communication is targeted for text extraction. The electronic mail text extraction subsystem 212 is further configured to detect the one or more first textual contents within the one or more electronic mail files by applying a regular expression (RegEx) text extraction process. The regular expression text extraction process is configured to be applied on one or more electronic mail formatting settings for detecting at least one of: one or more plain textual contents and one or more hypertext markup language (HTML) embedded contents.

The electronic mail text extraction subsystem 212 is further configured to convert the one or more hypertext markup language (HTML) embedded contents to the one or more plain textual contents by parsing the one or more hypertext markup language (HTML) embedded contents based on an hypertext markup language (HTML) parsing process. In an embodiment, the hypertext markup language (HTML) parsing process guarantees consistent and accessible textual content regardless of a format in an original electronic mail. In an embodiment, the hypertext markup language (HTML) parsing process may utilize at least one of: BeautifulSoup, and a Python library, to parse a hypertext markup language (HTML) structure and convert it into a plain text.

The electronic mail text extraction subsystem 212 is further configured to extract one or more sender information from the one or more electronic mail files to identify and remove the one or more second textual contents associated with the one or more electronic mail senders In an embodiment, the one or more second textual contents are unrelated textual contents to be removed from the one or more electronic mails. In an embodiment, the one or more second textual contents associated with the one or more electronic mail senders include at least one of: greetings, salutations, signatures, and the like.

In an embodiment, the electronic mail text extraction subsystem 212 may utilize parsing algorithms to detect boundaries of the one or more last received electronic mails (e.g., one or more latest electronic mails) within the one or more electronic mail chains. By analyzing headers and contextual cues, the electronic mail text extraction subsystem 212 may isolate the main body text while disregarding earlier parts of the one or more electronic mail chains In an embodiment, the electronic mail text extraction subsystem 212 may utilize the parsing algorithms to identify and eliminate unnecessary content (the one or more second textual contents) including at least one of: the greetings, the salutations, the signatures, and other non-essential information, from the one or more last received electronic mails.

The plurality of subsystems 110 further includes the electronic mail intent analyzing subsystem 214 that is communicatively connected to the one or more hardware processors 204. The electronic mail intent analyzing subsystem 214 is configured to analyze the intent of the one or more electronic mails based on the first transformer-based machine learning model. The electronic mail intent analyzing subsystem 214 is configured to integrate the outputs of the electronic mail data receiving subsystem 210 and the electronic mail text extraction subsystem 212.

The electronic mail intent analyzing subsystem 214 is configured to perform at least one of: a tokenization process and a multilabel classification process for analyzing the intent of the one or more electronic mails, using the first transformer-based machine learning model. In an embodiment, the first transformer-based machine learning model may be a DistilRoBERTa Base model.

For analyzing the intent of the one or more electronic mails, the first transformer-based machine learning model is configured to obtain at least one of: the one or more metadata and the one or more first textual contents extracted from the one or more last received electronic mails. The first transformer-based machine learning model is further configured to analyze at least one of: the one or more metadata and the one or more first textual contents to optimize one or more text data associated with at least one of: the one or more metadata and the one or more first textual contents, based on the tokenization process.

The first transformer-based machine learning model is further configured to convert the one or more text data associated with at least one of: the one or more metadata and the one or more first textual contents, into one or more tokens (e.g., one or more subword tokens), based on the tokenization process. In an embodiment, the first transformer-based machine learning model is configured to detect one or more nuanced semantic relationships on the one or more text data based on the one or more tokens. The first transformer-based machine learning model is further configured to analyze the intent of the one or more electronic mails by categorizing the one or more electronic mails into one or more distinct intent categories based on the multilabel classification process. In an embodiment, the one or more distinct intent categories include at least one of: procure-to-pay (P2P), dispute, follow up, account statement request, invoice request, payment confirmation, and query and miscellaneous. Each intent category constitutes a separate classification task, and the output of the first transformer-based machine learning model represents the likelihood of an electronic mail belonging to each intent category.

In an embodiment, the one or more electronic mails may be categorized into more than one intent category. In an embodiment, the procure-to-pay (P2P) electronic mail intent category signifies a process of at least one of: requisitioning, purchasing, receiving, paying for and accounting for goods and services in an ordered sequence of procurement, and financial processes, starting with the first steps of procuring a good or service to the final steps involved in paying for the good or service. As a non-limiting example, the one or more electronic mails in the procure-to-pay (P2P) intent category involve payment-related inquiries or issues. The one or more electronic mails in the procure-to-pay (P2P) may include at least one of: requests for payment instructions, payment delays, questions about a payment process, and the like.

In another embodiment, the dispute electronic mail intent category signifies invoice and billing statement discrepancies that arise when a client decides that the client should not be responsible to pay an invoice. As a non-limiting example, the dispute-related electronic mail may be when a client reports a perceived inaccuracy in a billing document or the client is unsatisfied with a service and raises a dispute. As another non-limiting example, the one or more electronic mails categorized in the disputes intent category often involve disagreements or discrepancies between the invoice and what the client/customer believes the customer owes. The one or more electronic mails may include at least one of: complaints, claims of overbilling, requests for resolution, and the like.

In yet another embodiment, the follow-up electronic mail intent category signifies a process of customers contacting an accounts receivable department to inquire about their invoice or payment status. The follow-up electronic mail intent category may include at least one of: questions about the amount owed, payment due date, payment methods, and the like. Conversely, the follow-up electronic mail further signifies the process of the one or more users contacting the customers who have not paid their invoices on time to remind them of their outstanding balance and request payment. The follow-up electronic mails are typically reminders or status updates related to outstanding invoices. The follow-up electronic mails may include at least one of: gentle reminders for pending payments, updates on payment plans, and the like.

In yet another embodiment, the account statement request electronic mail intent category signifies a request of account statements by the customers, which provide an overview of all transactions and outstanding balances. The customers may ask for the account statements to reconcile their records. In yet another embodiment, the invoice request intent category signifies the one or more electronic mails from the customers or clients who need copies of specific invoices or billing details. The customer/clients may have lost the original invoice or require additional documentation for their records.

In yet another embodiment, the payment confirmation intent category signifies the one or more electronic mails that confirm that a payment has been received. These one or more electronic mails often serve as receipts and can help both the one or more users and the customers keep track of successful transactions. In yet another embodiment, the query email intent category signifies the one or more electronic mails sent by the customers to the accounts receivable department to inquire about their invoice or payment status. These one or more electronic mails may include at least one of: questions about the amount owed, payment due date, payment methods, and the like. In yet another embodiment, the miscellaneous electronic mail intent category encompasses a wide range of inquiries that don't fit into the other categories. The miscellaneous electronic mail intent category may include questions about account balances, account setup, general account-related inquiries, and the like.

The first transformer-based machine learning model is fine-tuned for categorizing the one or more electronic mails into one or more distinct intent categories. By combining one or more pretrained inner layers with carefully designed one or more outer layers initialized with random weights, the entire first transformer-based machine learning model undergoes fine-tuning to adapt its parameters to the nuances of the intent prediction task. In another embodiment, during the training phase, architectural modifications are made to optimize the first transformer-based machine learning model for intent classification. Likewise, one or more hyperparameters including at least one of: learning rates, batch sizes, and regularization strength, are meticulously selected to enhance learning dynamics of the first transformer-based machine learning model. In other words, the first transformer-based machine learning model is optimized to categorize the one or more electronic mails into one or more distinct intent categories by selecting one or more hyperparameters comprising at least one of: learning rates, batch sizes, and regularization strength.

In yet another embodiment, during the training phase, the first transformer-based machine learning model (e.g., the DistilRoBERTa Base) is trained to learn from a wide variety of the one or more electronic mails which have been labelled according to fall into at least one intent category selected from: the Procure-to-pay (P2P) intent, the dispute intent, the follow-up intent, the account statement request intent, the invoice request intent, the payment confirmation intent, the query intent and the miscellaneous intent.

In certain embodiments, one or more optimization strategies are employed to elevate an accuracy of the first transformer-based machine learning model. Weighted loss functions address class imbalances, ensuring the first transformer-based machine learning model effectively learns from diverse intent categories. In an embodiment, to determine the optimal training strategy, one or more optimizers including at least one of: Adam and SGD, coupled with learning rate schedulers including the ReduceLROnPlateau scheduler, are explored and evaluated. In another embodiment, the selection of specific weight values, optimizer algorithms, and scheduler configurations plays a pivotal role in fine-tuning the convergence and generalization capabilities of the first transformer-based machine learning model.

In one embodiment, the electronic mail intent analyzing subsystem 214 is configured to encapsulate an essence of bidirectional contextual learning, an intrinsic aspect of transformer-based architectures. During the training phase, the first transformer-based machine learning model is configured to capture information from both the left and right sides of a context of the one or more tokens. This bidirectional learning approach empowers the first transformer-based machine learning model to decode intricate semantic relationships embedded within the text, contributing to a nuanced understanding of intent cues.

The electronic mail intent analyzing subsystem 214 is configured to generate one or more confidence scores for each intent analyzed for the one or more electronic mails by providing probability distribution over the one or more tokens based on a softmax function. The one or more tokens with optimum probability (e.g., highest probability) are selected as the analyzed intent of the one or more electronic mails and the corresponding probability of the one or more tokens is taken as the confidence score. In an alternative non-limiting example, other industry-standard methods including at least one of: calibration and uncertainty estimation are utilized by the DistilRoBERTa base to generate the one or more confidence scores. In an embodiment, the electronic mail intent and the one or more confidence score are used for updating data objects or the one or more databases 108 for standardization and categorization purposes.

The plurality of subsystems 110 further includes the electronic mail reason code classification subsystem 216 that is communicatively connected to the one or more hardware processors 204. The electronic mail reason code classification subsystem 216 is configured to classify the one or more electronic mails into the one or more reason codes based on the second transformer-based machine learning model. In certain embodiments, the one or more reason codes are a predefined set of categories or codes used to classify and track the reasons why certain events or transactions occur in a business. The one or more reason codes are used to identify and understand the underlying causes of business processes, events, or outcomes. The one or more reason codes are important in business due to the reason that they provide a standardized and consistent way to categorize and track data across different departments and systems. The one or more reason codes help organizations to identify patterns, trends, and opportunities for improvement, as well as to monitor and control risks and compliance.

In certain embodiments, the organizations develop and implement the one or more reason codes by identifying key events or transactions that the organizations want to track and categorize, and then creating a set of standardized codes that reflect the most common reasons for those events or transactions. The one or more reason codes are not standardized across the industry, and may vary from one organization to the other. In one embodiment, the one or more reason codes includes, but is not limited to, one or more product reason codes, one or more service reason codes, one or more customer reason codes, one or more account reason codes, one or more transaction reason codes, one or more location reason codes, one or more payment reason codes, and the like.

The one or more product reason codes are typically assigned to individual products, and are used to at least one of, track sales, inventory, and other important metrics. The one or more service reason codes are typically assigned to individual services, and are used to at least one of: track sales, inventory, and other important metrics. The one or more customer reason codes and the one or more account reason codes are typically used to track customer behavior, including at least one of: purchase history, payment patterns, and other important information.

The one or more transaction reason codes are used to track individual transactions, including at least one of: purchases, returns, and other types of events. The one or more transaction reason codes are typically used to identify a specific reason why a transaction occurred, including at least one of: a product defect, a pricing error, and a customer complaint.

The one or more location reason codes are typically assigned to individual stores, warehouses, or other physical locations, and are used to track inventory, sales, and other important metrics at a location level. The one or more payment reason codes are used to track individual payment transactions, including at least one of: credit card transactions, checks, and electronic transfers. The one or more payment reason codes are typically used to identify a specific reason why a payment was made, including at least one of: a customer payment, a vendor payment, and a refund.

In an embodiment, the electronic mail reason code classification subsystem 216 is configured to integrate the outputs of electronic mail intent analyzing subsystem 214 to tag the one or more reason codes. In another embodiment, the electronic mail reason code classification subsystem 216 is based on the second transformer-based machine learning model (a combination of a spaCy model and the RoBERTa Base transformer model). In an embodiment, the spaCy model uses the RoBERTa Base transformer model as a transformer component in its pipeline. This utilization allows the spaCy model to leverage the features learned by RoBERTa base to improve the efficiency of the outcome.

In an embodiment, the electronic mail reason code classification subsystem 216 is configured to utilize a fine-tuned spaCy model, a natural language processing library, with the RoBERTa Base transformer model. In certain embodiments, the electronic mail content is subjected to a sequence of preprocessing steps to ensure optimal analysis. For classifying the one or more electronic mails into the one or more reason codes, the second transformer-based machine learning model is configured to obtain the one or more first textual contents. The second transformer-based machine learning model is further configured to convert the one or more first textual contents into the one or more tokens, based on the tokenization process.

The second transformer-based machine learning model is further configured to apply an entity masking process on the one or more first textual contents to normalize one or more words (e.g., amount and date) essential in the one or more first textual contents. This normalization of the one or more words primes the textual content for consistent and accurate analysis. The second transformer-based machine learning model is further configured to apply at least one of: a lemmatization process and a stopword process to refine the one or more first textual contents. In certain embodiments, the lemmatization process of the spaCy model is configured to transform the one or more words into their base forms, while the stopword process is configured to eliminate the stopwords to emphasize content-bearing terms.

The second transformer-based machine learning model is further configured to extract one or more first linguistic information associated with the one or more tokens corresponding to the one or more first textual contents. In other words, the electronic mail reason code classification subsystem 216 is configured to utilize linguistic features of the spaCy model including at least one of: part-of-speech tagging and syntactic parsing to extract one or more first linguistic information (e.g., relevant linguistic information). The second transformer-based machine learning model is further configured to generate one or more contextually relevant embeddings capturing intricate semantics nuances related to the one or more electronic mails by applying the extracted one or more first linguistic information on the first transformer-based machine learning model (e.g., the RoBERTa Base model).

The second transformer-based machine learning model is further configured to assign one or more scores to the one or more reason codes based on at least one of: the one or more contextually relevant embeddings and the one or more first linguistic information associated with the one or more electronic mails. The second transformer-based machine learning model is further configured to classify the one or more reason codes for the one or more electronic mails based on one or more optimum scores (e.g., highest scores) assigned to the one or more reason codes. In an embodiment, the identified reason code and corresponding reason are used for updating data objects or the one or more databases 108 for standardization and categorization purposes.

In certain embodiments, each electronic mail is segmented into one or more chunks of words. The one or more chunks are correlated with their corresponding one or more reason codes, forming a foundation of training data for the electronic mail reason code classification subsystem 216. The segmentation process assists in capturing/detecting the nuanced context in which the one or more reason codes are mentioned. The alignment of the one or more chunks with specific reason codes facilitates the ability of the second transformer-based machine learning model to grasp pertinent patterns during the training phase.

The plurality of subsystems 110 further includes the named entity recognition subsystem 218 that is communicatively connected to the one or more hardware processors 204. The named entity recognition subsystem 218 is configured to extract the information associated with the one or more named entities from the textual information associated with the one or more unstructured and unlabeled electronic mails based on the third transformer-based machine learning model. In an embodiment, the information associated with the one or more named entities includes at least one of, names of one or more electronic mail senders, one or more organizations, one or more dates, one or more times, one or more invoice numbers, one or more amounts, and the like. In an embodiment, the named entity recognition subsystem 218 is based on the third transformer-based machine learning model (a combination of the spaCy model and the RoBERTa Base transformer model). In an embodiment, the spaCy model uses the RoBERTa Base transformer model as the transformer component in its pipeline. This utilization allows the spaCy model to leverage the features learned by RoBERTa base to improve the efficiency of the outcome. In another embodiment, an internal architecture of the named entity recognition subsystem 218 is based on the integration of capabilities of the spaCy model with the RoBERTa Base transformer model.

In certain embodiments, for training of the RoBERTa Base transformer model within the spaCy model's framework, a set of hyperparameters are essential. The set of hyperparameters include at least one of: batch size, dropout, max_steps, eval_frequency, optimizers, beta1, beta2, ents_f, ents_p, ents_r, architectures, max_batch_items, hidden_width, and more. The set of hyperparameters is configured to control the training process, influencing factors including at least one of: optimization algorithms, learning rates, architectural configurations, and the like.

For extracting the information associated with the one or more named entities, the third transformer-based machine learning model is configured to obtain the textual information associated with the one or more unstructured and unlabeled electronic mails. The third transformer-based machine learning model is further configured to scan the textual information associated with the one or more unstructured and unlabeled electronic mails for extracting the one or more named entities. The third transformer-based machine learning model is further configured to apply the textual information associated with the one or more unstructured and unlabeled electronic mails on the third transformer-based machine learning model. The third transformer-based machine learning model is further configured to extract one or more patterns indicating the one or more named entities by leveraging one or more second linguistic information (using a pre-trained RoBERTa Base transformer model) associated with the one or more unstructured and unlabeled electronic mails.

In an embodiment, the one or more named entities are used for updating data objects or the one or more databases 108 for standardization purposes in the named entity standardization subsystem 220, and subsequent categorization purposes in the categorization subsystem 222.

The plurality of subsystems 110 includes the named entity standardization subsystem 220 that is communicatively connected to the one or more hardware processors 204. The named entity standardization subsystem 220 is configured to standardize the extracted information associated with the one or more named entities by refining and harmonizing the information associated with the one or more named entities, ensuring uniformity and compatibility for efficient storage within the one or more databases 108. Following the entity recognition process by the named entity recognition subsystem 218, the named entity standardization subsystem 220 aligns named extracted entities with standardized conventions to facilitate data management.

In a non-limiting example, upon successful named entity recognition, the named entity standardization subsystem 220 is configured to apply a series of logical transformations to achieve a standardized representation of monetary values. For instance, when an amount like "Rs. 1011" is identified, the named entity standardization subsystem 220 is configured to dynamically post-process the information associated with the amount into the standardized form "INR 1011," wherein "INR" signifies the 3-letter currency code for Indian Rupees. The named entity standardization subsystem 220 is further configured to address a multitude of currency representations, encompassing symbols, full names, and abbreviated forms, to ensure a uniform currency format across the one or more databases 108.

In a non-limiting example, the named entity standardization subsystem 220 is configured to apply a series of logical transformations to achieve a standardized representation of dates. The named entity standardization subsystem 220 is further configured to convert diverse date formats to a universally recognized standard. When the machine learning model identifies dates like "3rd June 2021," the named entity standardization subsystem 220 is configured to post-process the information associated with the dates into the consistent "2021/06/03" or "06/03/2021" format. This standardized approach, adhering to the YYYY/MM/DD or MM/DD/YYYY structure, guarantees easy data organization and accessibility within the one or more databases 108, thus enhancing data integrity.

In a non-limiting example, the named entity standardization subsystem 220 is configured to apply a series of logical transformations to achieve a standardized representation of varied currency representations to maintain consistency. With precision, the named entity standardization subsystem 220 is further configured to post-process an array of currency symbols, names, and abbreviations including "$," "Dollars," "US," and "USD" into the standardized 3-letter currency format "USD." Subsequently, the named entity standardization subsystem 220 is further configured to meticulously prefix the monetary value, producing a unified entity. For example, "US$500" elegantly transforms into "USD500," ensuring a standardized and coherent currency representation throughout the one or more databases 108.

In a non-limiting example, the named entity standardization subsystem 220 is configured to apply a series of logical transformations to achieve a standardized representation of duration. When the machine learning model identifies diverse duration ranges, such as "Aug to Sep," the named entity standardization subsystem 220 is configured to post-process to mold these ranges into a standardized structure. The named entity standardization subsystem 220 is further configured to segregate start date and end date using a hyphen ("-") and ensures the dates are consistently formatted as "YYYY/MM/DD." Consequently, "Aug to Sep" metamorphoses into "2022/08/01-2022/09/30," presenting a cohesive and standardized duration representation suitable for database storage and retrieval.

In another embodiment, the standardized one or more named entities are used for updating data objects or the one or more databases 108 for categorization purposes in the Categorization subsystem 222.

The plurality of subsystems 110 includes the categorization subsystem 222 that is communicatively connected to the one or more hardware processors 204. The categorization subsystem 222 is configured to group the one or more electronic mails into the one or more categories based on at least one of: the intent of the one or more electronic mails, the one or more reason codes, and the standardized information associated with the one or more named entities. The categorization subsystem 222 is configured to receive the data objects updated by the electronic mail intent analyzing subsystem 214, the electronic mail reason code classification subsystem 216, and the named entity standardization subsystem 220, and to update the data objects or the one or more databases 108 which categorizes an electronic mail based on one or more factors.

In an embodiment, the categorization subsystem 222 is responsible for a systematic and granular organization of incoming electronic mails based on a multi-dimensional criteria set. Leveraging the outputs from earlier subsystems, the categorization subsystem 222 is configured to orchestrate a sophisticated categorization process. In one embodiment, the categorization subsystem 222 is configured to utilize the electronic mail intent information generated by the electronic mail intent analyzing subsystem 214, systematically grouping the one or more electronic mails into the one or more distinct categories or buckets according to their identified intent.

In another embodiment, the categorization subsystem 222 is configured to simultaneously incorporate the one or more electronic mail reason codes assigned by the electronic mail reason code classification subsystem 216, tagging each electronic mail with one or more reason codes to reflect the underlying reasons for the communication. This allows for the creation of categories based on the nature of the electronic mail's purpose, whether it is related to procurement, disputes, follow-ups, or other business functions. In another embodiment, the categorization subsystem 222 is configured to capitalize on the named entity standardization performed by the named entity standardization subsystem 220, identifying the one or more electronic mails including specific named entities such as monetary values, dates, or organizations. The categorization subsystem 222 is further configured to group the one or more electronic mails into corresponding categories, facilitating efficient access and management of the one or more electronic mails with similar named entities.

In another embodiment, the categorization subsystem 222 is configured to intelligently combine criteria from electronic mail intent, the one or more reason codes, and the one or more named entities, to create nuanced and specialized categories, enhancing the granularity of classification. Ultimately, this categorization process optimizes electronic mail management, enabling the one or more users to efficiently navigate and prioritize the one or more electronic mails based on their distinct attributes and purpose, thereby streamlining communication workflows.

As an example, the one or more electronic mails with both an intent related to payments (e.g., "payment confirmation") and a reason code indicating urgency (e.g., "urgent") are categorized as "urgent payment requests." This ensures that urgent payment-related electronic mails are given immediate attention. Similarly, the one or more electronic mails related to "invoice issues" and with a "follow up" intent are categorized as "invoice issues requiring follow-up," streamlining the handling of invoice-related concerns.

The plurality of subsystems 110 includes the output subsystem 224 that is communicatively connected to the one or more hardware processors 204. The output subsystem 224 is configured to provide the output of the one or more categorized electronic mails to the one or more users on the user interface associated with the one or more electronic devices 102. The output subsystem 224 acts as a bridge between the backend processing and the end-users (e.g., the one or more users), ensuring that the results of the categorization process are intelligently displayed for user interaction. In an embodiment, one or more data analysts, one or more business analysts, one or more cash analysts, one or more financial analysts, one or more collection analysts, one or more debt collectors, one or more professionals associated with cash and collection management, and the like.

In one embodiment, the output subsystem 224 is configured to organize the one or more electronic mails into user-friendly, visually distinct categories or buckets, making it easier for the one or more users to access, review, and prioritize their electronic mails. In another embodiment, each category is typically represented as a separate section or tab within the user interface. The one or more users can then click on or navigate to these categories to view the one or more categorized electronic mails that share similar characteristics, including at least one of: the intent, the one or more reason codes, and the one or more named entities.

In another embodiment, the functionality of the output subsystem 224 extends to provide user-friendly options for further actions, including responding to, forwarding, and archiving the one or more electronic mails within each category. The presentation of one or more categorized electronic mails optimizes user productivity and enhances the overall electronic mail management experience. Additionally, the output subsystem 224 may incorporate user preferences and customization options to tailor a display to individual user needs, ensuring a personalized and efficient electronic mail management system. In another embodiment, the functionality of the output subsystem 224 includes configuring the system to automatically take actions on the basis of the identified intent. In a non-limiting example, the output subsystem 224 is configured to automatically capture required data for the user actions based on the intent, and present the data to the one or more users.

The plurality of subsystems 110 includes the retraining subsystem 226 that is communicatively connected to the one or more hardware processors 204. The retraining subsystem 226 is configured to re-train one or more machine learning models (e.g., one or more transformer-based machine learning models) including at least one of: the first machine learning model (e.g., the first transformer-based machine learning model), the second machine learning model (e.g., the second transformer-based machine learning model), and the third machine learning model (e.g., the third transformer-based machine learning model), over the plurality of time intervals based on one or more training data.

In one embodiment, the retraining subsystem 226 is configured to continually enhance the performance and adaptability of the ML-based computing system 104 over time by incorporating new data and insights. The retraining subsystem 226 is communicatively connected to the underlying hardware processors 204, allowing it to efficiently leverage computational resources for its operations. In another embodiment, the primary configuration of the retraining subsystem 226 involves the process of retraining the entire ML-based computing system 104 with fresh and up-to-date data. This data typically includes newly received electronic mails, as well as additional labelled data that augments the knowledge base of the ML-based computing system 104.

For re-training the one or more transformer-based machine learning models over the plurality of time intervals, the retraining subsystem 226 is configured to receive the one or more training data associated with the one or more categorized electronic mails, from the output subsystem 224. The retraining subsystem 226 is configured to accumulate and preprocess the new data (e.g., the one or more training data), ensuring the new data aligns with existing data formats and standards of the ML-based computing system 104. Then, the retraining subsystem 226 is configured to initiate the fine-tuning of the one or more transformer-based machine learning models, including at least one of: language models or classifiers, used throughout the electronic mail processing pipeline. The retraining subsystem 226 is further configured to add the one or more training data with one or more original training datasets to generate one or more updated training datasets. In other words, the fine-tuning incorporates the new data, enabling the transformer-based machine learning models to adapt to evolving language patterns, intent categorizations, reason code classifications, and named entity recognition.

The retraining subsystem 226 is further configured to re-train the one or more transformer-based machine learning models by adjusting at least one of, the one or more hyperparameters and one or more training configurations of at least one of: the electronic mail intent analyzing subsystem 214, the electronic mail reason code classification subsystem 216, and the named entity recognition subsystem 218. In other words, the one or more hyperparameters and the one or more training configurations are meticulously adjusted to optimize the performance of the one or more transformer-based machine learning models. The retraining subsystem 226 is further configured to execute the re-trained one or more transformer-based machine learning models in at least one of: the electronic mail intent analyzing subsystem 214, the electronic mail reason code classification subsystem 216, and the named entity recognition subsystem 218, to output the one or more categorized electronic mails Additionally, the retraining subsystem 226 is configured to play a pivotal role in addressing model drift and maintaining high accuracy. The retraining subsystem 226 is further configured to implement strategies including at least one of: periodic retraining schedules and continuous learning techniques to ensure the ML-based computing system 104 remains proficient in categorizing and processing the one or more electronic mails accurately. In an embodiment, the retraining subsystem 226 is further configured to facilitate version control and model deployment, ensuring a smooth transition from older model versions to newly retrained versions. In some embodiments, the retraining subsystem 226 is retrained after a predetermined amount of time passes (e.g., a week, a month, and the like) using an updated training dataset that additionally includes new context or data.

In some implementations, the retraining subsystem 226 may be implemented using high-performance processing units for evaluating extracted data accuracy against reference or ground truth data, where high-speed CPUs or dedicated neural processing units (NPUs) may be needed. These processors would handle intense operations including at least one of: exact matching, fuzzy matching, and similarity metrics computations with efficiency, ensuring rapid feedback cycles. The retraining subsystem 226 may additionally be implemented with expanded memory, wherein integrated high-capacity random access memory (RAM), combined with fast sold state drives (SSDs), may be used to support the instantaneous access and storage of vast amounts of data, facilitating comparison tasks including contrasting extracted invoice numbers with stored reference data. Additionally, a dedicated graphics processing Unit (GPU) may be used to satisfy the computational demands of machine learning-based classification and model fine-tuning.

In some implementations, the retraining subsystem 226 may also be implemented with advanced data storage solutions to serve varied data elements including at least one of: customer details, invoice information, and signature data, scalable storage solutions that are paramount. Fast-access storage solutions like non-volatile memory express (NVMe) SSDs may be incorporated, ensuring quick retrieval of reference datasets, coupled with long-term storage hard disk drives (HDDs) for archived reports and historical datasets.

In some embodiments, the retraining subsystem 226 may be implemented with dedicated interfaces, including at least one of: field programmable gate array (FPGA), application-specific integrated circuits (ASIC) implementations, and the like, that facilitate feedback assimilation into the data extraction pipeline. These dedicated interfaces may offer swift adjustments to model parameters, data preprocessing techniques, or feature selection based on real-time or periodic feedback. To allow the retraining subsystem 226 to operate autonomously at predetermined intervals or in real-time, dedicated workflow controller modules may be embedded. These components, possibly developed as ASICs, may be used to automate tasks including at least one of: model retraining using updated datasets, triggering event-based feedback, and initiating system-wide performance evaluations.

Figure 3:
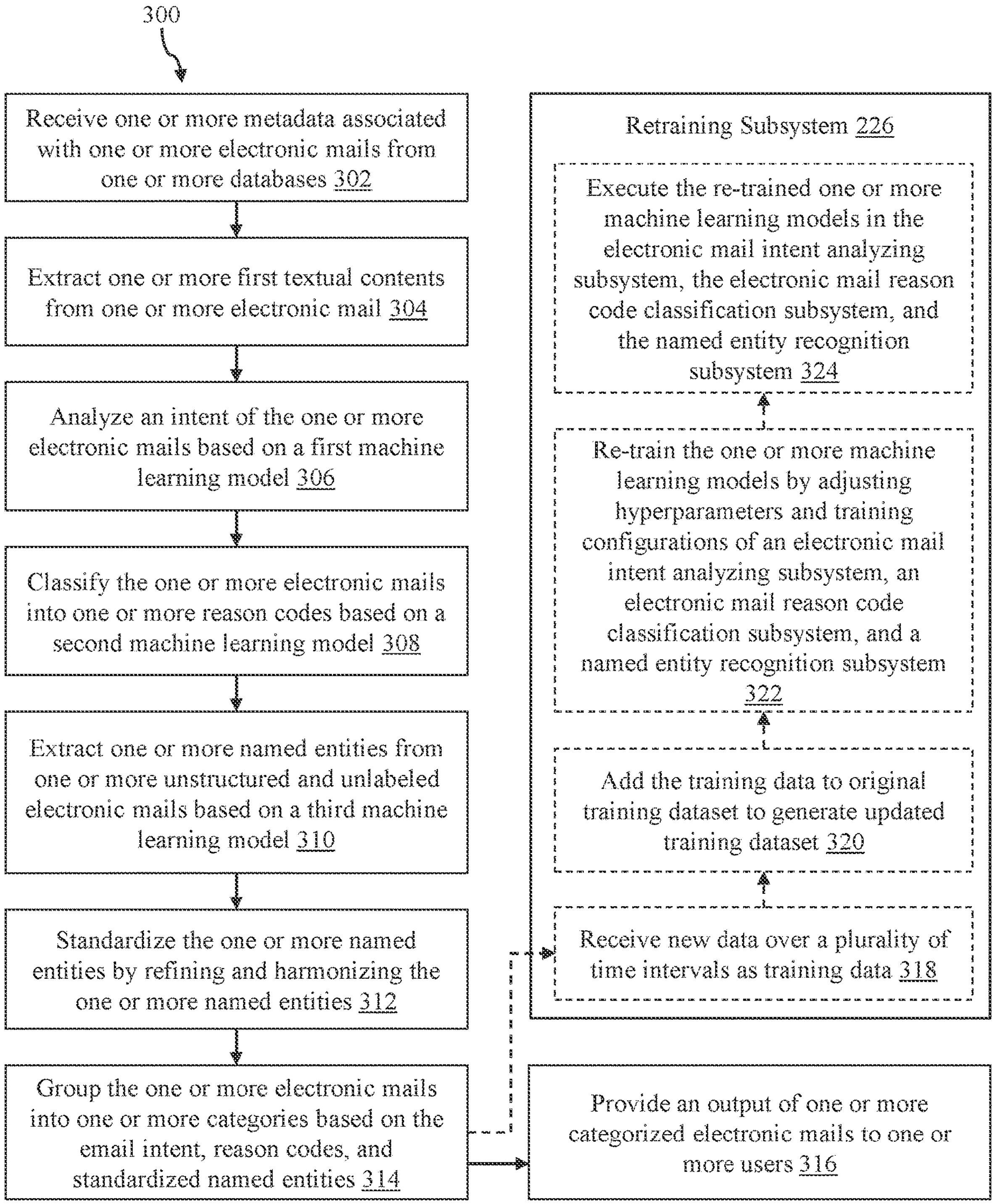
FIG. 3 is an overall process flow of generating one or more categorized electronic mails based on the intent, in accordance with another embodiment of the present disclosure.

FIG. 3 is an overall process flow 300 of generating one or more categorized electronic mails based on the intent, in accordance with another embodiment of the present disclosure. At step 302, the one or more metadata associated with the one or more electronic mails are received from the one or more databases 108. In an embodiment, the one or more metadata associated with the one or more electronic mails comprise at least one of: the one or more primary electronic mail keys, the one or more raw electronic mail links, the one or more conversation identities, the one or more electronic mail receipt dates, and the one or more sender identities.

At step 304, the one or more first textual contents are extracted from the one or more last received electronic mails within the one or more electronic mail chains stored in the one or more electronic mail files by preprocessing the one or more last received electronic mails.

At step 306, the intent of the one or more electronic mails is analyzed based on the first transformer-based machine learning model. At step 308, the one or more electronic mails are classified into the one or more reason codes based on the second transformer-based machine learning model. At step 310, the information associated with the one or more named entities are extracted from the textual information associated with the one or more unstructured and unlabeled electronic mails based on the third transformer-based machine learning model.

At step 312, the extracted information associated with the one or more named entities are standardized by refining and harmonizing the information associated with the one or more named entities. At step 314, the one or more electronic mails are grouped into the one or more categories based on at least one of: the intent of the one or more electronic mails, the one or more reason codes, and the standardized information associated with the one or more named entities. At step 316, the output of the one or more categorized electronic mails is provided to the one or more users on the user interface associated with the one or more electronic devices 102.

At step 318, the one or more training data associated with the one or more categorized electronic mails, from the output subsystem 224. At step 320, the one or more training data are added with the one or more original training datasets to generate one or more updated training datasets. At step 322, the one or more transformer-based machine learning models are re-trained/updated by adjusting at least one of: the one or more hyperparameters and one or more training configurations of at least one of: the electronic mail intent analyzing subsystem 214, the electronic mail reason code classification subsystem 216, and the named entity recognition subsystem 218. At step 324, the re-trained/updated one or more transformer-based machine learning models are executed in at least one of: the electronic mail intent analyzing subsystem 214, the electronic mail reason code classification subsystem 216, and the named entity recognition subsystem 218, to output the one or more categorized electronic mails.

Figure 4:
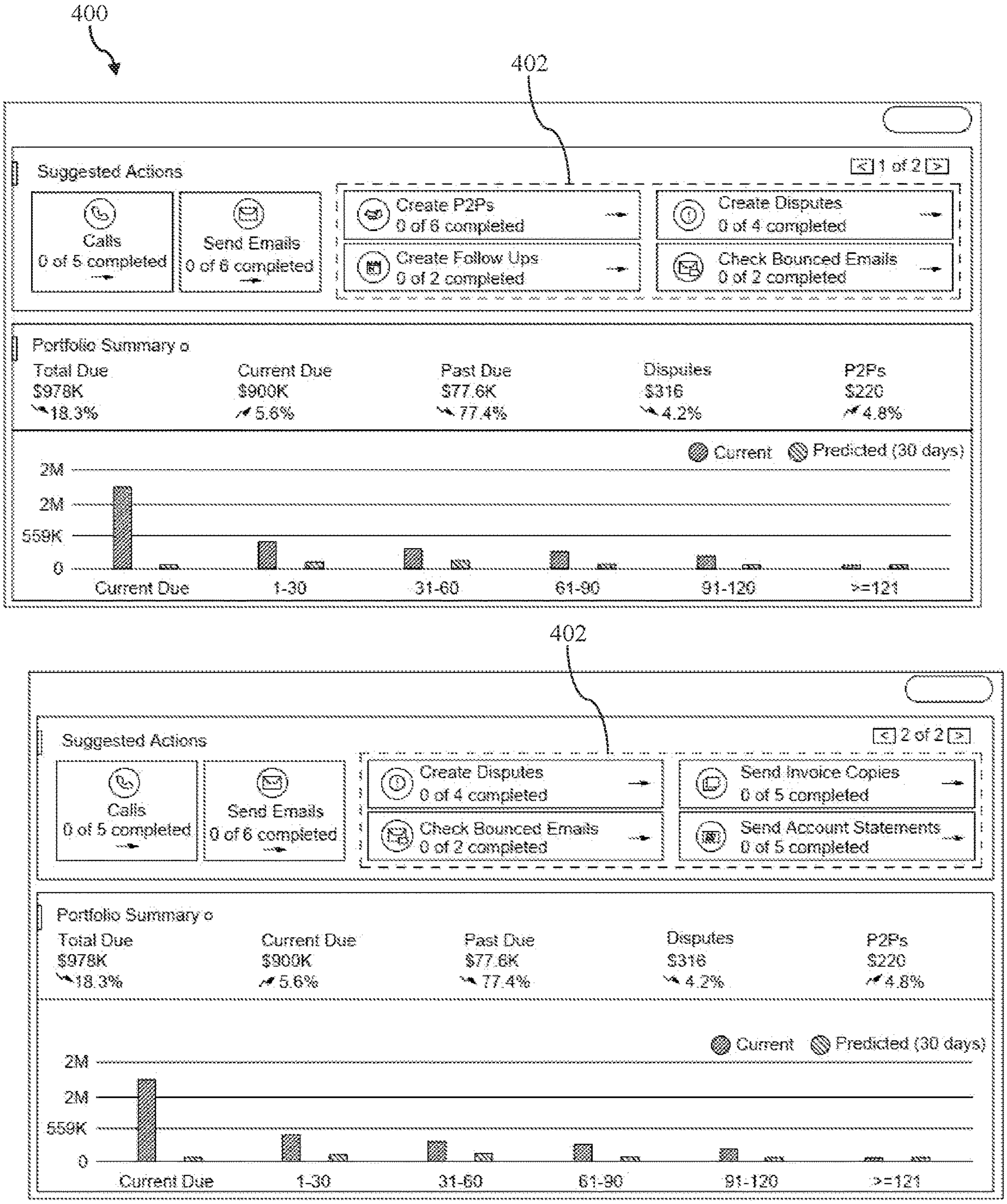
FIG. 4 is an exemplary graphical representation of an output of the ML-based computing system for analyzing the intent of the one or more electronic mails, in accordance with an embodiment of the present disclosure.

FIG. 4 is an exemplary graphical representation 400 of an output of the ML-based computing system 104 for analyzing the intent of the one or more electronic mails, in accordance with an embodiment of the present disclosure. The graphical representation 400 shows that the ML-based computing system 104 automatically analyzes the intent 402 of the one or more electronic mails including at least one of: create P2P, create follow ups, create disputes, send invoice copies, send accounts statements, and the like.

Figure 5:
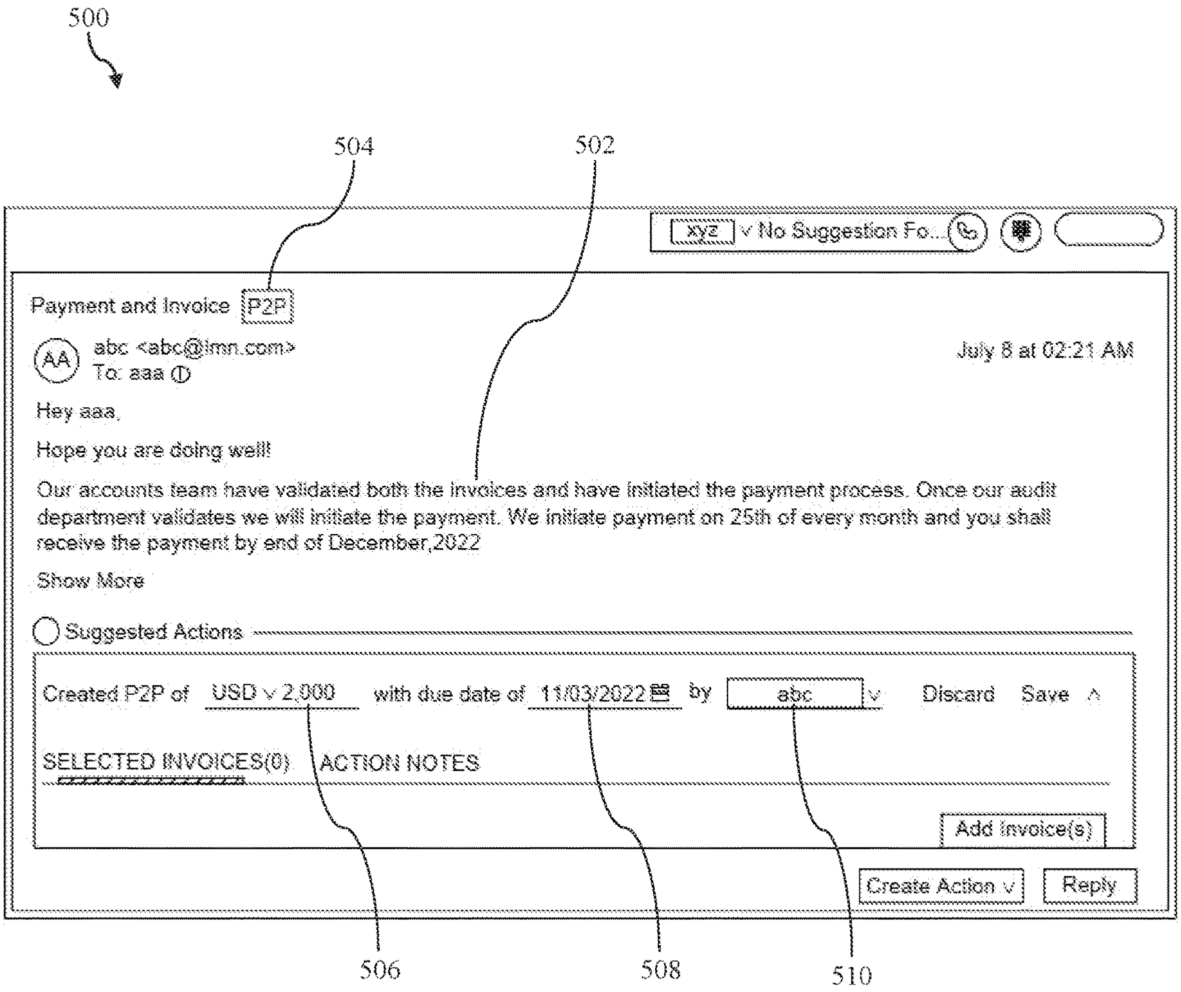
FIG. 5 is an exemplary graphical representation of the output of the ML-based computing system for analyzing the intent of the one or more electronic mails, in accordance with an embodiment of the present disclosure.

FIG. 5 is an exemplary graphical representation 500 of the output of the ML-based computing system 104 for analyzing the intent of the one or more electronic mails, in accordance with an embodiment of the present disclosure. The graphical representation 500 shows that the ML-based computing system 104 automatically analyzes the intent of one or more electronic mails 502 is a procure-to-pay (P2P) request 504.

Further, the ML-based computing system 104 captures a procure-to-pay (P2P) amount 506, due date 508 and a person who committed the payment amount 510. In an embodiment, some information in FIG. 5, are redacted as the information relates to personal identifiable information.

Figure 6:
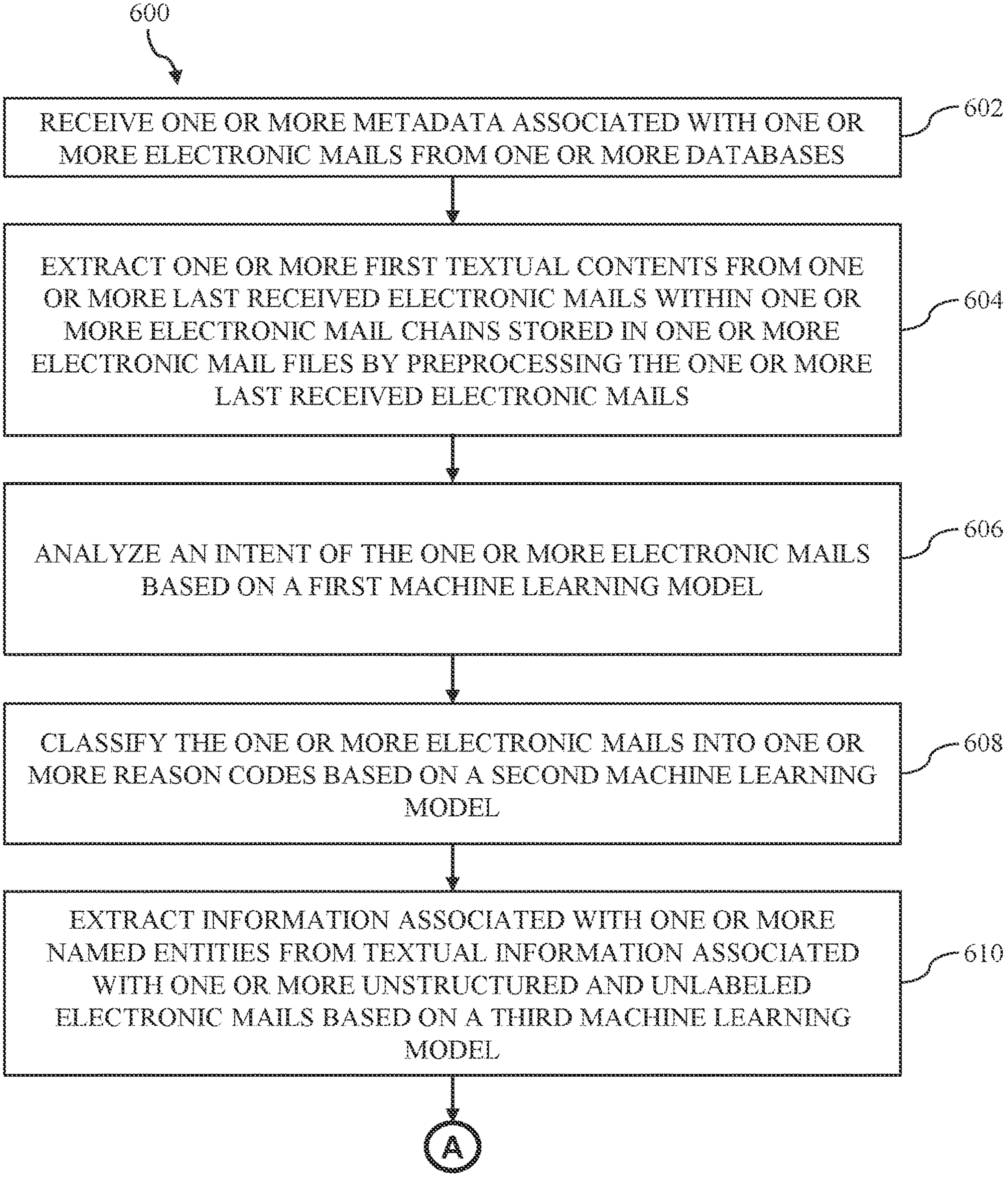
FIG. 6 is a flow chart illustrating a machine-learning based (ML-based) computing method for analyzing the intent of the one or more electronic mails and segmenting the one or more electronic mails based on the intent, in accordance with an embodiment of the present disclosure.
Figure 6:
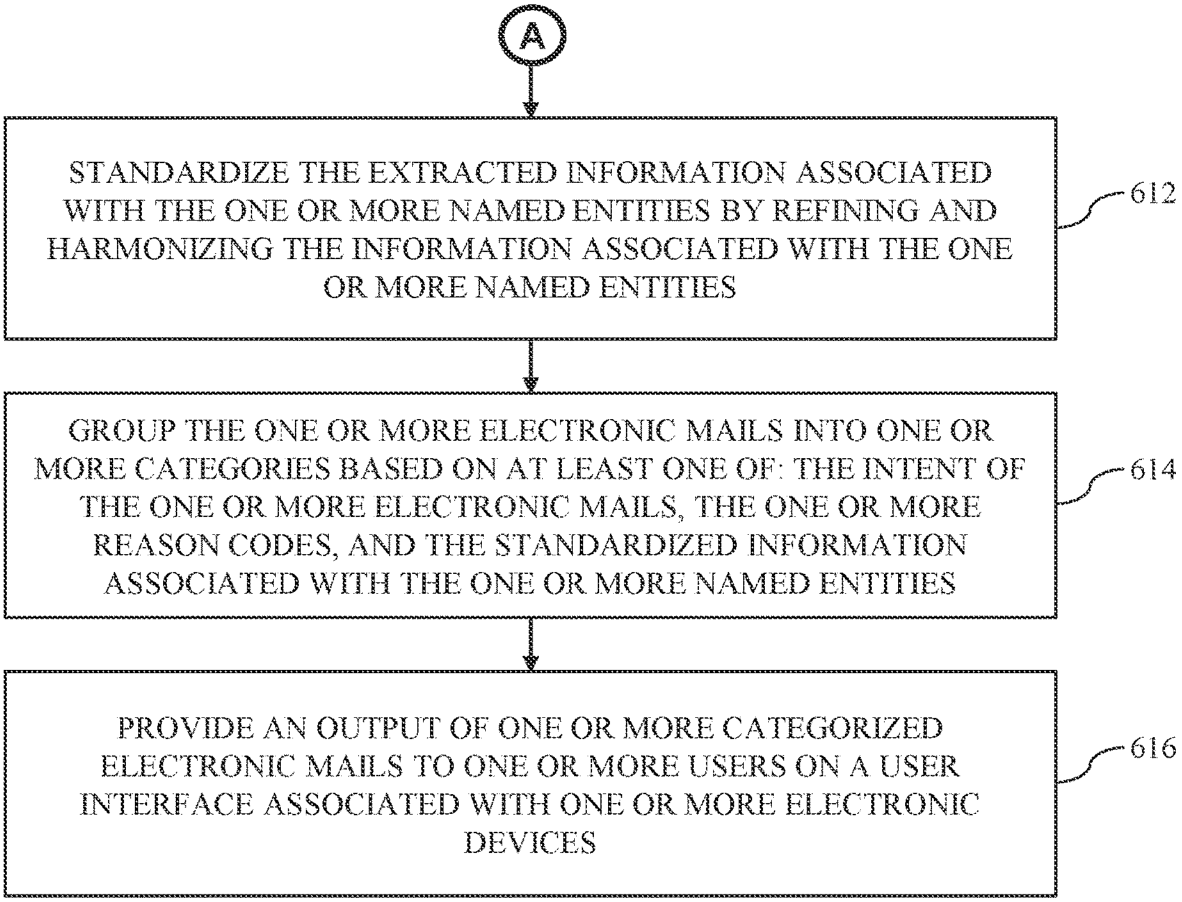

FIG. 6 is a flow chart illustrating a machine-learning based (ML-based) computing method 600 for analyzing the intent of the one or more electronic mails and segmenting the one or more electronic mails based on the intent, in accordance with an embodiment of the present disclosure.

At step 602, the one or more metadata associated with the one or more electronic mails are received from the one or more databases 108. In an embodiment, the one or more metadata associated with the one or more electronic mails comprise at least one of: the one or more primary electronic mail keys, the one or more raw electronic mail links, the one or more conversation identities, the one or more electronic mail receipt dates, and the one or more sender identities.

At step 604, the one or more first textual contents are extracted from the one or more last received electronic mails within the one or more electronic mail chains stored in the one or more electronic mail files by preprocessing the one or more last received electronic mails.

At step 606, the intent of the one or more electronic mails is analyzed based on the first transformer-based machine learning model. At step 608, the one or more electronic mails are classified into the one or more reason codes based on the second transformer-based machine learning model. At step 610, the information associated with the one or more named entities are extracted from the textual information associated with the one or more unstructured and unlabeled electronic mails based on the third transformer-based machine learning model.

At step 612, the extracted information associated with the one or more named entities are standardized by refining and harmonizing the information associated with the one or more named entities. At step 614, the one or more electronic mails are grouped into the one or more categories based on at least one of: the intent of the one or more electronic mails, the one or more reason codes, and the standardized information associated with the one or more named entities. At step 616, the output of the one or more categorized electronic mails is provided to the one or more users on the user interface associated with the one or more electronic devices 102. In FIG. 6, the circular symbol with "A" written inside is being used as an off-page connector. This is used for indicating that FIG. 6 continues in the next page.

The present invention has the following advantages. The present invention with the ML-based computing system 104 is configured to provide one or more categorized electronic mails to the one or more users. The ML-based computing system 104 and the ML-based computing method 600 enhance efficiency, accuracy, and productivity, delivering significant benefits to personnel engaged in accounts receivables management.

Further, the present invention is configured to automatically analyze the intent of the one or more electronic mails sent by the customers/clients so that the present invention does not require human intervention in analyzing the one or more electronic mails. Hence, the significant risk of human error can be avoided during analyzing the one or more electronic mails and the time consuming for analyzing the one or more electronic mails can be minimized.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O)) devices (including but not limited to keyboards, displays, pointing devices, etc.) can be coupled to the ML-based computing system 104 either directly or through intervening I/O controllers Network adapters may also be coupled to the ML-based computing system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based computing system 104 in accordance with the embodiments herein. The ML-based computing system 104 herein comprises at least one processor or central processing unit (CPU). The CPUs are interconnected via system bus 208 to various devices including at least one of, a random-access memory (RAM), read-only memory (ROM), and an input/output (I/O) adapter. The I/O adapter can connect to peripheral devices, including at least one of: disk units and tape drives, or other program storage devices that are readable by the ML-based computing system 104. The ML-based computing system 104 can read the inventive instructions on the program storage devices and follow these instructions to execute the methodology of the embodiments herein.

The ML-based computing system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) computing method for analyzing an intent of one or more electronic mails, the ML-based computing method comprising:

receiving, by one or more hardware processors, one or more metadata associated with the one or more electronic mails from one or more databases, wherein the one or more metadata associated with the one or more electronic mails comprise at least one of: one or more primary electronic mail keys, one or more raw electronic mail links, one or more conversation identities, one or more electronic mail receipt dates, and one or more sender identities;

extracting, by the one or more hardware processors, one or more first textual contents from one or more last received electronic mails within one or more electronic mail chains stored in one or more electronic mail files by preprocessing the one or more last received electronic mails;

analyzing, by the one or more hardware processors, the intent of the one or more electronic mails based on a first machine learning model, comprises:

obtaining, by the one or more hardware processors, at least one of: the one or more metadata and the one or more first textual contents extracted from the one or more last received electronic mails;

analyzing, by the one or more hardware processors, at least one of: the one or more metadata and the one or more first textual contents to optimize one or more text data associated with at least one of: the one or more metadata and the one or more first textual contents, based on a tokenization process;

converting, by the one or more hardware processors, the one or more text data associated with at least one of: the one or more metadata and the one or more first textual contents, into one or more tokens, based on the tokenization process, wherein the first machine learning model is configured to detect one or more semantic relationships on the one or more text data based on the one or more tokens; and analyzing, by the one or more hardware processors, the intent of the one or more electronic mails by categorizing the one or more electronic mails into one or more distinct intent categories based on a multilabel classification process, wherein the one or more distinct intent categories comprise at least one of: procure-to-pay (P2P), dispute, follow up, account statement request, invoice request, payment confirmation, query and miscellaneous;

classifying, by the one or more hardware processors, the one or more electronic mails into one or more reason codes based on a second machine learning model;

extracting, by the one or more hardware processors, information associated with one or more named entities from textual information associated with one or more unstructured and unlabeled electronic mails based on a third machine learning model;

wherein the first machine-learning model, the second machine-learning model, and the third machine-learning model comprises one or more transformer-based machine learning models;

standardizing, by the one or more hardware processors, the extracted information associated with the one or more named entities by refining and harmonizing the information associated with the one or more named entities;

grouping, by the one or more hardware processors, the one or more electronic mails into one or more categories based on at least one of: the intent of the one or more electronic mails, the one or more reason codes, and the standardized information associated with the one or more named entities;

providing, by the one or more hardware processors, an output of one or more categorized electronic mails to one or more users on a user interface associated with one or more electronic devices;

re-training, by the one or more hardware processors, the first machine learning model, the second machine learning model, and the third machine learning model using training data associated with the one or more categorized electronic mails, by adjusting at least one of: one or more hyperparameters and one or more training configurations of at least one of: an electronic mail intent analyzing subsystem, an electronic mail reason code classification subsystem, and a named entity recognition subsystem; and executing, by the one or more hardware processors, the re-trained first machine learning model, the re-trained second machine learning model, and the re-trained third machine learning model to analyze one or more subsequent electronic mails to output one or more subsequent categorized electronic mails.

2. The machine-learning based (ML-based) computing method of claim 1, wherein preprocessing the one or more last received electronic mails comprises:

identifying, by the one or more hardware processors, the one or more last received electronic mails by analyzing one or more timestamps associated with the one or more electronic mails based on an electronic mail identification process;

detecting, by the one or more hardware processors, the one or more first textual contents within the one or more electronic mail files by applying a regular expression text extraction process, wherein the regular expression text extraction process is configured to be applied on one or more electronic mail formatting settings for detecting at least one of: one or more plain textual contents and one or more hypertext markup language (HTML) embedded contents;

converting, by the one or more hardware processors, the one or more hypertext markup language (HTML) embedded contents to the one or more plain textual contents by parsing the one or more hypertext markup language (HTML) embedded contents based on an hypertext markup language (HTML) parsing process; and extracting, by the one or more hardware processors, one or more sender information from the one or more electronic mail files to identify and remove one or more second textual contents associated with the one or more electronic mail senders, wherein the one or more second textual contents associated with the one or more electronic mail senders comprise at least one of: greetings, salutations, and signatures.

3. The machine-learning based (ML-based) computing method of claim 1, wherein:

the first machine learning model is fine-tuned for categorizing the one or more electronic mails into one or more distinct intent categories;

the first machine learning model is optimized to categorize the one or more electronic mails into one or more distinct intent categories by selecting one or more hyperparameters comprising at least one of: learning rates, batch sizes, and regularization strength; and the first machine learning model is trained to learn from the one or more electronic mails being labelled under the one or more distinct intent categories.

4. The machine-learning based (ML-based) computing method of claim 1, further comprising generating, by the first machine learning model, one or more confidence scores for each intent analyzed for the one or more electronic mails by providing probability distribution over the one or more tokens based on a softmax function, wherein the one or more tokens with optimum probability are selected as the analyzed intent of the one or more electronic mails.

5. The machine-learning based (ML-based) computing method of claim 1, wherein classifying, by the second machine learning model, the one or more electronic mails into the one or more reason codes comprises:

obtaining, by the one or more hardware processors, the one or more first textual contents;

converting, by the one or more hardware processors, the one or more first textual contents into the one or more tokens, based on the tokenization process;

applying, by the one or more hardware processors, entity masking process on the one or more first textual contents to normalize one or more words essential in the one or more first textual contents;

applying, by the one or more hardware processors, at least one of: a lemmatization process and a stopword process to refine the one or more first textual contents;

extracting, by the one or more hardware processors, one or more first linguistic information associated with the one or more tokens corresponding to the one or more first textual contents;

generating, by the one or more hardware processors, one or more contextually relevant embeddings capturing intricate semantics related to the one or more electronic mails by applying the extracted one or more first linguistic information on the first machine learning model;

assigning, by the one or more hardware processors, one or more scores to the one or more reason codes based on at least one of: the one or more contextually relevant embeddings and the one or more first linguistic information associated with the one or more electronic mails; and classifying, by the one or more hardware processors, the one or more reason codes for the one or more electronic mails based on one or more optimum scores assigned to the one or more reason codes, wherein the one or more reason codes comprise at least one of: one or more product reason codes, one or more service reason codes, one or more customer reason codes, one or more account reason codes, one or more transaction reason codes, one or more location reason codes, one or more payment reason codes.

6. The machine-learning based (ML-based) computing method of claim 1, wherein the third machine learning model is an integration of at least one of: the first machine learning model and the second machine learning model, and wherein extracting, by the third machine learning model, the information associated with the one or more named entities comprises:

obtaining, by the one or more hardware processors, the textual information associated with the one or more unstructured and unlabeled electronic mails;

scanning, by the one or more hardware processors, the textual information associated with the one or more unstructured and unlabeled electronic mails for extracting the one or more named entities;

applying, by the one or more hardware processors, the textual information associated with the one or more unstructured and unlabeled electronic mails on the third machine learning model; and extracting, by the one or more hardware processors, one or more patterns indicating the one or more named entities by leveraging one or more second linguistic information associated with the one or more unstructured and unlabeled electronic mails, wherein the information associated with the one or more named entities comprises at least one of: names of one or more electronic mail senders, one or more organizations, one or more dates, one or more times, one or more invoice numbers, and one or more amounts.

7. The machine-learning based (ML-based) computing method of claim 1, wherein re-training the one or more machine learning models over the plurality of time intervals comprises:

receiving, by the one or more hardware processors, the one or more training data associated with the one or more categorized electronic mails, from an output subsystem; and adding, by the one or more hardware processors, the one or more training data with one or more original training datasets to generate one or more updated training datasets.

8. The machine-learning based (ML-based) computing method of claim 1, wherein the one or more metadata associated with the one or more electronic mails, are extracted from the one or more databases based on one or more techniques comprising at least one of: data normalization, data anonymization, data aggregation, data analysis, and data storage; and wherein the one or more databases comprises at least one of: one or more relational databases, one or more object-oriented databases, one or more data warehouses, and one or more cloud-based databases.

9. A machine learning based (ML-based) computing system for analyzing an intent of one or more electronic mails, the ML-based computing system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

an electronic mail data receiving subsystem configured to receive one or more metadata associated with the one or more electronic mails from one or more databases, wherein the one or more metadata associated with the one or more electronic mails comprise at least one of: one or more primary electronic mail keys, one or more raw electronic mail links, one or more conversation identities, one or more electronic mail receipt dates, and one or more sender identities;

an electronic mail text extraction subsystem configured to extract one or more first textual contents from one or more last received electronic mails within one or more electronic mail chains stored in one or more electronic mail files by preprocessing the one or more last received electronic mails;

an electronic mail intent analyzing subsystem configured to analyze the intent of the one or more electronic mails based on a first machine learning model;

wherein in analyzing the intent of the one or more electronic mails, the electronic mail intent analyzing subsystem is configured to:

obtain at least one of: the one or more metadata and the one or more first textual contents extracted from the one or more last received electronic mails;

analyze at least one of: the one or more metadata and the one or more first textual contents to optimize one or more text data associated with at least one of: the one or more metadata and the one or more first textual contents, based on a tokenization process;

convert the one or more text data associated with at least one of: the one or more metadata and the one or more first textual contents, into one or more tokens, based on the tokenization process, wherein the first machine learning model is configured to detect one or more semantic relationships on the one or more text data based on the one or more tokens; and analyze the intent of the one or more electronic mails by categorizing the one or more electronic mails into one or more distinct intent categories based on a multilabel classification process, wherein the one or more distinct intent categories comprise at least one of: procure-to-pay (P2P), dispute, follow up, account statement request, invoice request, payment confirmation, query and miscellaneous;

an electronic mail reason code classification subsystem configured to classify the one or more electronic mails into one or more reason codes based on a second machine learning model;

a named entity recognition subsystem configured to extract information associated with one or more named entities from textual information associated with one or more unstructured and unlabeled electronic mails based on a third machine learning model;

wherein the first machine-learning model, the second machine-learning model, and the third machine-learning model comprises one or more transformer-based machine learning models;

a named entity standardization subsystem configured to standardize the extracted information associated with the one or more named entities by refining and harmonizing the information associated with the one or more named entities;

a categorization subsystem configured to group the one or more electronic mails into one or more categories based on at least one of: the intent of the one or more electronic mails, the one or more reason codes, and the standardized information associated with the one or more named entities;

an output subsystem configured to provide an output of one or more categorized electronic mails to one or more users on a user interface associated with one or more electronic devices;

a retraining subsystem configured to:

re-train the first machine learning model, the second machine learning model, and the third machine learning model using training data associated with the one or more categorized electronic mails, by adjusting at least one of: one or more hyperparameters and one or more training configurations of at least one of: an electronic mail intent analyzing subsystem, an electronic mail reason code classification subsystem, and a named entity recognition subsystem; and execute the re-trained first machine learning model, the re-trained second machine learning model, and the re-trained third machine learning model to analyze one or more subsequent electronic mails to output one or more subsequent categorized electronic mails.

10. The machine-learning based (ML-based) computing system of claim 9, wherein in preprocessing the one or more last received electronic mails, the electronic mail text extraction subsystem is configured to:

identify the one or more last received electronic mails by analyzing one or more timestamps associated with the one or more electronic mails based on an electronic mail identification process;

detect the one or more first textual contents within the one or more electronic mail files by applying a regular expression text extraction process, wherein the regular expression text extraction process is configured to be applied on one or more electronic mail formatting settings for detecting at least one of: one or more plain textual contents and one or more hypertext markup language (HTML) embedded contents;

convert the one or more hypertext markup language (HTML) embedded contents to the one or more plain textual contents by parsing the one or more hypertext markup language (HTML) embedded contents based on an hypertext markup language (HTML) parsing process; and extract one or more sender information from the one or more electronic mail files to identify and remove one or more second textual contents associated with the one or more electronic mail senders, wherein the one or more second textual contents associated with the one or more electronic mail senders comprise at least one of: greetings, salutations, and signatures.

11. The machine-learning based (ML-based) computing system of claim 9, wherein:

the first machine learning model is fine-tuned for categorizing the one or more electronic mails into one or more distinct intent categories;

the first machine learning model is optimized to categorize the one or more electronic mails into one or more distinct intent categories by selecting one or more hyperparameters comprising at least one of: learning rates, batch sizes, and regularization strength; and the first machine learning model is trained to learn from the one or more electronic mails being labelled under the one or more distinct intent categories.

12. The machine-learning based (ML-based) computing system of claim 9, wherein the electronic mail intent analyzing subsystem is configured to generate one or more confidence scores for each intent analyzed for the one or more electronic mails by providing probability distribution over the one or more tokens based on a softmax function, wherein the one or more tokens with optimum probability are selected as the analyzed intent of the one or more electronic mails.

13. The machine-learning based (ML-based) computing system of claim 9, wherein in classifying, by the second machine learning model, the one or more electronic mails into the one or more reason codes, the electronic mail reason code classification subsystem is configured to:

obtain the one or more first textual contents;

convert the one or more first textual contents into the one or more tokens, based on the tokenization process;

apply entity masking process on the one or more first textual contents to normalize one or more words essential in the one or more first textual contents;

apply at least one of: a lemmatization process and a stopword process to refine the one or more first textual contents;

extract one or more first linguistic information associated with the one or more tokens corresponding to the one or more first textual contents;

generate one or more contextually relevant embeddings capturing intricate semantics related to the one or more electronic mails by applying the extracted one or more first linguistic information on the first machine learning model;

assign one or more scores to the one or more reason codes based on at least one of: the one or more contextually relevant embeddings and the one or more first linguistic information associated with the one or more electronic mails; and classify the one or more reason codes for the one or more electronic mails based on one or more optimum scores assigned to the one or more reason codes, wherein the one or more reason codes comprise at least one of: one or more product reason codes, one or more service reason codes, one or more customer reason codes, one or more account reason codes, one or more transaction reason codes, one or more location reason codes, one or more payment reason codes.

14. The machine-learning based (ML-based) computing system of claim 9, wherein the third machine learning model is an integration of at least one of: the first machine learning model and the second machine learning model, and wherein in extracting, by the third machine learning model, the information associated with the one or more named entities, the named entity recognition subsystem is configured to:

obtain the textual information associated with the one or more unstructured and unlabeled electronic mails;

scan the textual information associated with the one or more unstructured and unlabeled electronic mails for extracting the one or more named entities;

apply the textual information associated with the one or more unstructured and unlabeled electronic mails on the third machine learning model; and extract one or more patterns indicating the one or more named entities by leveraging one or more second linguistic information associated with the one or more unstructured and unlabeled electronic mails, wherein the information associated with the one or more named entities comprises at least one of: names of one or more electronic mail senders, one or more organizations, one or more dates, one or more times, one or more invoice numbers, and one or more amounts.

15. The machine-learning based (ML-based) computing system of claim 9, wherein in re-training the one or more machine learning models over the plurality of time intervals, the retraining subsystem is configured to:

receive the one or more training data associated with the one or more categorized electronic mails, from an output subsystem; and add the one or more training data with one or more original training datasets to generate one or more updated training datasets.

16. The machine-learning based (ML-based) computing system of claim 9, wherein the one or more metadata associated with the one or more electronic mails, are extracted from the one or more databases based on one or more techniques comprising at least one of: data normalization, data anonymization, data aggregation, data analysis, and data storage; and wherein the one or more databases comprises at least one of: one or more relational databases, one or more object-oriented databases, one or more data warehouses, and one or more cloud-based databases.

17. A non-transitory computer-readable storage medium having instructions stored therein that when executed by a hardware processor, cause the processor to execute operations of:

receiving one or more metadata associated with the one or more electronic mails from one or more databases, wherein the one or more metadata associated with the one or more electronic mails comprise at least one of:

one or more primary electronic mail keys, one or more raw electronic mail links, one or more conversation identities, one or more electronic mail receipt dates, and one or more sender identities;

extracting one or more first textual contents from one or more last received electronic mails within one or more electronic mail chains stored in one or more electronic mail files by preprocessing the one or more last received electronic mails;

analyzing the intent of the one or more electronic mails based on a first machine learning model, comprises:

obtaining at least one of: the one or more metadata and the one or more first textual contents extracted from the one or more last received electronic mails;

analyzing at least one of: the one or more metadata and the one or more first textual contents to optimize one or more text data associated with at least one of: the one or more metadata and the one or more first textual contents, based on a tokenization process;

converting the one or more text data associated with at least one of: the one or more metadata and the one or more first textual contents, into one or more tokens, based on the tokenization process, wherein the first machine learning model is configured to detect one or more semantic relationships on the one or more text data based on the one or more tokens; and analyzing the intent of the one or more electronic mails by categorizing the one or more electronic mails into one or more distinct intent categories based on a multilabel classification process, wherein the one or more distinct intent categories comprise at least one of: procure-to-pay (P2P), dispute, follow up, account statement request, invoice request, payment confirmation, query and miscellaneous;

classifying the one or more electronic mails into one or more reason codes based on a second machine learning model;

extracting information associated with one or more named entities from textual information associated with one or more unstructured and unlabeled electronic mails based on a third machine learning model;

wherein the first machine-learning model, the second machine-learning model, and the third machine-learning model comprises one or more transformer-based machine learning models;

standardizing the extracted information associated with the one or more named entities by refining and harmonizing the information associated with the one or more named entities;

grouping the one or more electronic mails into one or more categories based on at least one of: the intent of the one or more electronic mails, the one or more reason codes, and the standardized information associated with the one or more named entities;

providing an output of one or more categorized electronic mails to one or more users on a user interface associated with one or more electronic devices;

re-training the first machine learning model, the second machine learning model, and the third machine learning model using the training data associated with one or more categorized electronic mails, by adjusting at least one of: one or more hyperparameters and one or more training configurations of at least one of: an electronic mail intent analyzing subsystem, an electronic mail reason code classification subsystem, and a named entity recognition subsystem; and executing the re-trained first machine learning model, the re-trained second machine learning model, and the re-trained third machine learning model to analyze one or more subsequent electronic mails to output one or more subsequent categorized electronic mails.

18. The non-transitory computer-readable storage medium of claim 17, wherein re-training the one or more machine learning models over the plurality of time intervals comprises:

receiving the one or more training data associated with the one or more categorized electronic mails, from an output subsystem; and adding the one or more training data with one or more original training datasets to generate one or more updated training datasets.

* * * * *